United States Patent [19]

Chen

[11] 4,206,184

[45] Jun. 3, 1980

[54] METHOD AND APPARATUS FOR THE CATALYTIC CONVERSION OF THE EXHAUST DISCHARGE OF INTERNAL COMBUSTION ENGINES

[76] Inventor: Tom P. Chen, 8452 Zephyr St., Arvada, Colo. 80005

[21] Appl. No.: 708,125

[22] Filed: Jul. 23, 1976

[51] Int. Cl.$^2$ .......................... B01D 53/34; F01N 3/15
[52] U.S. Cl. .................................. 423/213.2; 252/449; 252/454; 60/301; 422/177
[58] Field of Search .................. 423/213.2, 213.5, 247; 252/449, 454; 23/288 F; 60/301; 422/177

[56] References Cited

U.S. PATENT DOCUMENTS

| | | | |
|---|---|---|---|
| 2,797,247 | 6/1957 | Keith | 252/454 |
| 3,214,236 | 11/1965 | Weisz | 423/213.2 |
| 3,230,034 | 1/1966 | Stiles | 423/213.2 |
| 3,257,163 | 6/1966 | Stiles | 423/213.2 X |
| 3,498,928 | 3/1970 | Cho et al. | 423/213.2 X |
| 3,939,104 | 2/1976 | Campbell et al. | 423/213.5 |

FOREIGN PATENT DOCUMENTS 488100  11/1952  Canada ..................................... 423/212

OTHER PUBLICATIONS

Chemical Abstracts, vol. 63, 1965, p. 17207(f).

*Primary Examiner*—G. O. Peters
*Attorney, Agent, or Firm*—Sheridan, Ross, Fields & McIntosh

[57] ABSTRACT

Catalytic conversion of the exhaust discharge of internal combustion engines is accomplished by contacting the discharge with a naturally-occurring mineral chrysocolla, the structure of which provides a sufficiently large surface area without further support, the chrysocolla serving as an oxidizing catalyst and which can also be modified to serve as both an oxidation and reduction catalyst. The invention includes the catalytic converter device incorporating the catalyst.

7 Claims, 1 Drawing Figure

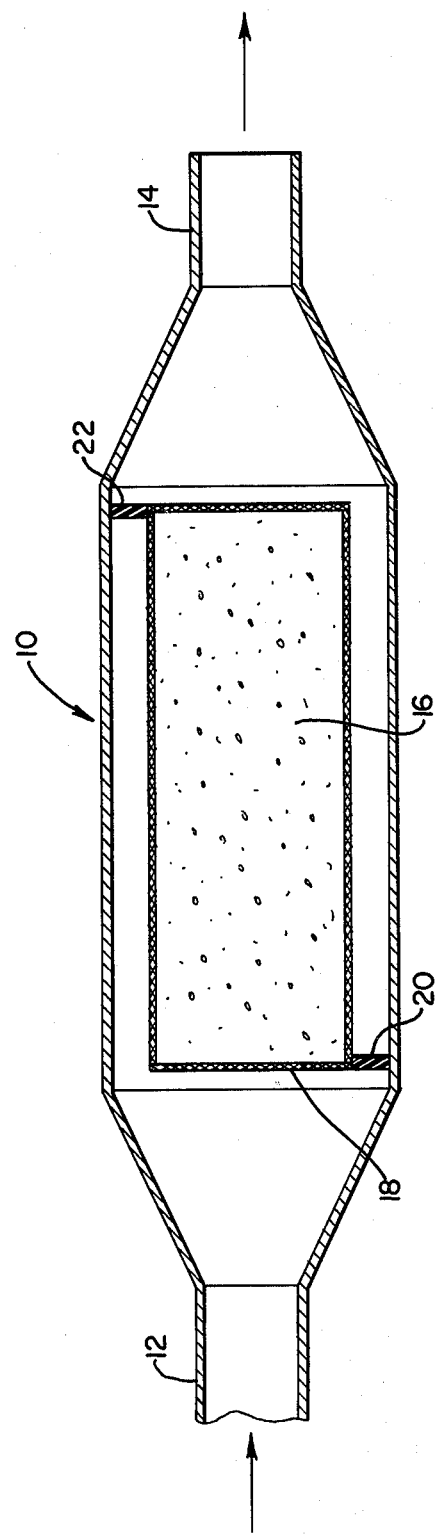

METHOD AND APPARATUS FOR THE CATALYTIC CONVERSION OF THE EXHAUST DISCHARGE OF INTERNAL COMBUSTION ENGINES

BACKGROUND OF THE INVENTION

1. Field of the Invention

The invention relates to methods and apparatus for the catalytic conversion of the exhaust discharge from internal combustion engines, particularly gasoline-burning engines.

2. The Prior Art

The automobile has been identified as one of the principal causes of air pollution. It has been recognized that in order to minimize this pollution catalytic conversion of harmful hydrocarbons, carbon monoxide and nitrogen-oxygen emissions to nitrogen, carbon dioxide and water is desirable. In fact, beginning with the introduction of the 1975 model year automobiles, catalytic converters have become standard equipment.

The catalytic converters now in use for automobiles in this country are based upon the use of the precious metals platinum and palladium as catalysts. These metals are rare and expensive. The United States produces substantially less of these metals than it consumes and is therefore dependent upon foreign sources for these key exhaust catalysts necessary for the control of air pollution caused by the exhaust discharge of internal combustion engines.

The presently used platinum and palladium catalysts have the additional disadvantage of being sensitive to lead which is a common gasoline additive. As a result, the United States government has mandated that new automobiles use only non-leaded gasolines and that a very expensive program of providing separate leaded and non-leaded gasoline be undertaken. A catalyst with substantially less sensitivity to lead poisoning is desired.

There are other applications, such as in underground mining and tunnelling where it is desirable to use internal combustion engines but where hydrocarbons and carbon monoxide products of combustion cannot be tolerated. A suitable, low cost catalyst for the oxidation of hydrocarbons and carbon monoxide is needed for these applications.

While it has been known for some time that copper has a strong catalytic effect in oxidation reactions, copper has not been commercially accepted as a catalyst for catalytic converters because the cost of equipment providing a suitable support for the copper catalyst to give adequate contact with the exhaust discharge and impregnating the copper onto the support is such that the cost advantage between use of a copper catalyst and a precious metal catalyst is not enough to warrant the use of copper over precious metal. That is, while copper is a suitable catalyst metal, its disadvantage in comparison to platinum or platinum-palladium is sufficiently large, considering the overall cost of the catalyst, including support preparation, that it has not attained commercial acceptance.

It is well known that copper as an oxidation catalyst is often modified by the addition of other metals. Specifically, copper chromite has been extensively tested in automotive catalytic converter applications and found to be more effective than copper alone.

In the catalytic conversion of exhaust from internal combustion engines, in addition to the oxidation of hydrocarbons and carbon monoxide, it is desirable at the same time to reduce nitrogen oxides. A separate catalyst, particularly a nickel containing catalyst, in combination with the oxidation catalyst, has been suggested for accomplishing this. It would clearly be very desirable to accomplish both catalytic activities on a single support. By this means, a substantial savings in catalyst cost can be effected.

Accordingly, it is a principal object of this invention to provide a catalytic material for catalytic conversion of the exhaust discharge of an internal combustion engine for which a separate support to provide adequate catalyst surface contact area is not required, which is otherwise more economical than conventional catalysts, which may be modified to function as both an oxidation and reduction catalyst, and which is less sensitive to lead poisoning than conventional catalysts for this purpose.

It is a further objective of this invention to provide a catalytic converter incorporating the catalytic material of this invention.

SUMMARY OF THE INVENTION

The method of the invention comprises reducing the content of noxious gases in the exhaust discharge of internal combustion engines before it passes to the atmosphere by contacting the exhaust discharge with chrysocolla in the presence of oxygen before it is released to the atmosphere. The chrysocolla itself serves as an oxidation catalyst. The invention includes the modification of chrysocolla to enhance its catalytic properties to produce a dual-functioning catalyst which catalyzes the oxidation of hydrocarbons and carbon monoxide in exhaust gases and also catalyzes the reduction of nitrogen oxides. The invention also includes a catalytic converter incorporating the catalytic material.

BRIEF DESCRIPTION OF THE DRAWING

The single FIGURE of the drawing is a cross-section of a schematic representation of a catalytic converter of the invention incorporating the new catalytic material of the invention.

DESCRIPTION OF THE PREFERRED EMBODIMENT

The mineral chrysocolla occurs extensively in nature and is well known as a commercial source of copper in deposits occurring in the southwestern United States. Chrysocolla is a copper silicate having the general formula $CuSiO_3 \cdot 2H_2O$.

Chrysocolla has a number of unique properties which enhance its suitability as a catalyst for use in a catalytic converter. First, it has a remarkably large surface area which is reported to be 287 square meters per gram of $-325$ mesh material. Thus, one of the requirements for use of a catalyst in catalytic converter applications, a large surface area for gas/solid contact, is met. In addition to providing the surface contact area required by virtue of its structure, the chrysocolla also provides the required catalytic activity.

Chrysocolla has a very high absorbency. As a result, larger amounts of a number of potential poisons such as sulfate, lead, and phosphate are absorbed before the catalyst loses as much activity as occurs with other catalysts.

Natural chrysocolla contains 45.2% copper and 34.3% silica. This is substantially more copper than may always be required in the catalytic application. It has been found that it is possible to leach out a substantial portion of the copper with, as an example, aqueous solutions of ammonia, without destroying the catalytically active silica network. This was demonstrated by leaching a mineral specimen of chrysocolla with ammonia to leach out a substantial amount of copper and comparing its crystal structure determined by X-ray analysis with that of an untreated specimen. The comparative results are shown below in Table 1.

TABLE ONE

| Comparison of Leached and Unleached Chrysocolla | | |
|---|---|---|
| Standard Pattern d Spacing A | Mineral Specimen Before Leaching | Mineral Specimen After Ammonia Leaching |
| 4.35 | 4.278 | 4.278 |
| 3.36 | 3.361 | 3.336 |
| 2.46 | 2.457 | 2.459 |
| 1.63 | 1.667 | 1.664 |
| 1.48 | 1.482 | 1.471 |
| 1.32 | 1.375 | 1.371 |

The crystal sites formerly occupied by the copper removed can be advantageously substituted by other metals, as is well known in the art. This makes possible the substitution of part of the copper with other metals for various purposes, such as for reducing catalysts. Examples of metals which can be advantageously precipitated on the active sites from which copper has been removed are nickel and ruthenium. Similarly, a modified catalyst can be prepared by adding rare earth nitrates to an oxylate-containing water slurry of the chrysocolla. The resulting rare earth oxylate precipitated on the chrysocolla is readily converted to oxides by calcination. The rare earth oxides can also serve the function of a reducing catalyst.

A practical application of the invention will be illustrated by reference to the drawing. The numeral 10 represents the outer casing of a catalytic converter made of metal or other suitable material. In this showing, the casing is of circular configuration, however, it may take other forms. The casing is cone-shaped at either end terminating in attachment 12 at the far end for gas-tight attachment to the discharge end of the exhaust pipe of an internal combustion engine, and terminating in gas outlet 14 at its other end. In this schematic, illustrative embodiment, the catalytic material 16 of the invention in pelletized form is supported within a wire gauze catalyst holder 18. Partial circumferential extending seals 20 and 22 are provided to insure that all of the exhaust gaseous discharge passes through the catalytic holder with maximum contact with the catalytic material supported therein.

The schematic illustration of the catalytic converter is merely illustrative of an operative embodiment incorporating the catalytic material and the apparatus of the invention is not limited to this modification as, obviously, other structures may be used, the requirement being that the catalytic material be supported in them to provide effective contact of the discharge gases with the catalytic material.

In operation, the converter is attached to the outlet end of the exhaust pipe of an internal combustion engine by means of the attachment 12 so that the gaseous discharge passes under pressure from the engine through the catalytic material 16 where oxidation and reduction occur and the catalytically converted discharge gases pass on out through the gas discharge outlet 14 to the atmosphere.

The operation of the method of the invention is illustrated by the following examples, which are illustrative but not limiting of the invention.

EXAMPLE ONE

The catalytic material for the example consisted of 900 grams of hand-picked granules of naturally occurring chrysocolla having the following size distribution:

| | |
|---|---|
| −42 mesh + 100 mesh | 12% |
| −100 mesh + 270 mesh | 78% |
| −270 mesh | 10% |

The chrysocolla was pelletized into $-\frac{3}{8}$ inch plus 1/16 inch diameter beads. The pellets were enclosed in a wire mesh screen which was in turn enclosed in a sheet metal cannister somewhat similar to the schematic representation of the drawing. The cannister was provided with a one half inch opening for attachment to the exhaust gas outlet of an automobile. The cannister was further provided with another one half inch opening for the admission of auxiliary air. The cannister was also provided with an exit nozzle and tubing for attachment to standard instruments for determining the amount of hydrocarbons anc carbon monoxide in the exit gases.

The converter device was connected to the exhaust pipe of a 1968 Plymouth automobile and the automobile mounted on a dynamometer to simulate road operating conditions. Comparative tests were made with no catalyst and with untreated chrysocolla as a catalyst with and without auxiliary air and the results recorded in Table 2 below.

TABLE TWO

| Mode | | % CO | Hydrocarbon (ppm Carbon) |
|---|---|---|---|
| A. | EPA Allowable 1968 Car 46 mph | 2.5 | 2832.6 |
| B. | 1968 Plymouth with No Catalyst | 2.7 | 2922 |
| C. | With Catalyst, No Auxiliary Air | 1.1 | 798 |
| D. | With Catalyst and Auxiliary Air | 0.7 | 658 |
| E. | EPA Allowable 1968 Car 30.5 mph | 2.1 | 2957 |
| F. | 1968 Plymouth with No Catalyst | 3.5 | 3694 |
| G. | With Catalyst No Auxiliary Air | 1.3 | 1040 |
| H. | With Catalyst and Auxiliary Air | 0.9 | 814 |

EXAMPLE TWO

The same equipment, including the same catalyst, was used for this example except that a muffler-type cannister was used which did not have provision for auxiliary air. The results using an automobile idling are as follows:

TABLE THREE

| Mode | | % CO | Hydrocarbon ppm |
|---|---|---|---|
| A. | EPA Allowable 1968 Car | 4.0 | 350 |
| B. | 1968 Plymouth without Catalyst | 3.4 | 350 |
| C. | 1968 Plymouth with Catalyst | 1.2 | 170 |

It is seen from the above results that chrysocolla is highly effective as an oxidation catalyst in the presence of oxygen for oxidizing carbon monoxide and hydrocarbons emitted in the exhaust discharge of internal combustion engines. Chrysocolla in which nickel, ruthenium, or rare earths have replaced copper in some of the copper sites is equally effective as a reducing catalyst in reducing the nitrogen oxide content of such exhaust gases. It was found that the catalyst, modified or unmodified, was highly resistant to poisoning by lead and lead compounds.

From the above description and results, it is seen that an effective combination oxidation and reduction catalyst has been provided for the catalytic conversion of exhaust discharge from internal combustion engines.

It is seen from the above description and results that a method has been provided for the catalytic conversion of the exhaust discharge of internal combustion engines which utilizes a catalytic material inherently having sufficient surface area for the catalyst so that the provision of additional support means to give adequate surface contact area is avoided. The catalytic material can be modified to provide the dual functions of oxidation and reduction. The catalyst is readily available, inexpensive, and is more resistant to lead poisoning than conventional catalysts for the same purpose.

What is claimed is:

1. A method for reducing the content of noxious gases in the exhaust discharge of internal combustion engines before it passes to the atmosphere which comprises contacting said exhaust discharge with chrysocolla in the presence of oxygen before it is released to the atmosphere.

2. The method of claim 1 in which air is the source of oxygen.

3. The method of claim 1 in which at least some of the copper on the copper sites of the chrysocolla have been replaced by a reducing catalyst for nitrogen oxides.

4. The method of claim 3 in which the reducing catalyst is a material selected from the group consisting of ruthenium, nickel, and rare earths.

5. A catalytic converter for reducing the noxious gas content of exhaust discharges from internal combustion engines which comprises:
   (a) a housing;
   (b) means for attachment of said housing to an exhaust pipe of an internal combustion engine to place said housing in communication with said exhaust pipe;
   (c) outlet means for exhausting said exhaust discharge after catalytic conversion from said housing; and
   (d) chrysocolla supported in said housing for contact with said exhaust discharge as it passes through said housing.

6. The converter of claim 5 in which at least some of the copper on the copper sites of the chrysocolla have been replaced by a reducing catalyst for nitrogen oxides.

7. The converter of claim 6 in which the reducing catalyst is a material selected from the group consisting of ruthenium, nickel, and rare earths.

* * * * *